United States Patent [19]
Yoshimi

[11] Patent Number: 4,889,205
[45] Date of Patent: Dec. 26, 1989

[54] REAR WHEEL HOLDING MECHANISM FOR A MOTORCYCLE
[75] Inventor: Ishikawa Yoshimi, Tokyo, Japan
[73] Assignee: Honda Giken Kogyo Kabushiki Kaisha, Tokyo, Japan
[21] Appl. No.: 184,269
[22] Filed: Apr. 21, 1988
[30] Foreign Application Priority Data
  Apr. 21, 1987 [JP] Japan .................................. 62-99455
[51] Int. Cl.⁴ ............................................ B62K 25/28
[52] U.S. Cl. .................................. 180/227; 301/111; 301/114
[58] Field of Search ....................... 180/227, 230, 219; 301/111, 112, 114, 115, 122, 105 R, 105 B, 124 R, 126, 131

[56] References Cited
U.S. PATENT DOCUMENTS
  4,782,908 11/1988 Trema .................................. 180/227

FOREIGN PATENT DOCUMENTS
  0065127 11/1982 European Pat. Off. ............ 301/114
  0237302  9/1987 European Pat. Off. ............ 180/227
  1041379 10/1958 Fed. Rep. of Germany ...... 180/227
  62-29481  2/1987 Japan .................................. 180/227

Primary Examiner—David M. Mitchell
Attorney, Agent, or Firm—Lyon & Lyon

[57] ABSTRACT

The rear wheel holding mechanism of a motorcycle has a driving axle of double-shaft construction comprising an outer shaft having a comparatively large outside diameter and an inner shaft of comparatively small diameter wherein power is transmitted efficiently to the rear wheel through the large diameter outer shaft and the rear wheel is fastened to the driving axle by a screwed connection on the small diameter inner shaft whereby only a comparatively small torque is required. Thus, the efficiency of the motorcycle rear wheel mounting work is significantly improved.

12 Claims, 3 Drawing Sheets

REAR WHEEL HOLDING MECHANISM FOR A MOTORCYCLE

BACKGROUND OF THE INVENTION

The present invention relates to a rear wheel holding mechanism of the center bolt-type for a motorcycle having a cantilever swing arm rear wheel suspension and, more specifically, to a rear wheel holding mechanism facilitating mounting of the rear wheel to the motorcycle suspension.

Japanese Patent Provisional Publication (Kokai) No. 59-77911 discloses a rear wheel mounting mechanism for mounting a rear wheel on a cantilever swing arm. This rear wheel mounting mechanism has a rear axle having a radially extending flange provided with a plurality of stud bolts, and a rear wheel fastened to the flange by screwing nuts on the stud bolts. Japanese Patent Provisional Publication (Kokai) No. 61-129386, on the other hand, discloses a rear wheel mounting mechanism of a so-called center bolt type in which an axle having one end provided with an external thread extends coaxially through the hub of the rear wheel and a single axle nut is screwed onto the threaded end of the axle to fasten the rear wheel thereto.

The first-identified rear wheel mounting mechanism having a plurality of stud bolts requires excessive work for fastening or unfastening the plurality of nuts in mounting the rear wheel to, or in removing it from, the rear wheel mounting mechanism. The second-identified rear wheel mounting mechanism, being of the center bolt type, requires less work in fastening or unfastening a single nut for mounting the rear wheel to, or in removing it from, the rear wheel mounting mechanism. However, since the rear axle of the latter rear wheel mounting mechanism has a comparatively large diameter and is provided with an external thread, the outside diameter of the external thread is inevitably large, and, hence, a large torque is required to be applied to the axle nut in fastening the rear wheel to the rear axle. Accordingly, these known rear wheel mounting mechanisms are subject to further improvement in order to further facilitate replacement of the rear wheel for carrying out maintenance work. For racing motorcycles, in particular, facilitation of the rear wheel replacement is a significant subject.

Accordingly, it is an object of the present invention to provide a rear wheel holding mechanism of a center bolt type capable of fastening the rear wheel of a motorcycle, or the like, to its rear axle by screwing a single axle nut on the rear axle requiring a comparatively small torque to, thereby, improve the working facility.

SUMMARY OF THE INVENTION

To solve the foregoing problems, the present invention provides a rear wheel holding mechanism for a motorcycle comprising a swing arm having a front end pivotally connected to the main frame of a motorcycle; a driving shaft having an externally threaded portion on one end supported on the rear end of the swing arm and coaxially inserted through the hub of the rear wheel so that the threaded portion projects therefrom; and an axle nut screwed to the threaded portion of the driving shaft to fasten the rear wheel to the driving shaft, characterized in that the driving shaft is of a double-shaft construction comprising a hollow outer shaft and an inner shaft, whose diameter is smaller than that of the outer shaft, inserted through the outer shaft; a power transmitting member attached to the outer shaft; and the inner shaft having the externally threaded portion.

According to the present invention, the driving shaft is of a double-shaft construction having a hollow outer shaft and an inner shaft; the power transmitting member is secured to the outer shaft; and the inner shaft is provided with an externally threaded portion for engaging an axle nut on one end thereof. Therefore, driving power for the rear wheel is transmitted to the outer shaft having a larger diameter and, hence, a greater torque can be transmitted to the rear wheel. Also, the rear wheel can be fastened to the driving shaft by screwing the axle nut to the threaded portion of the reduced diameter inner shaft by a comparatively small torque.

For a better understanding of the invention, its operating advantages and the specific objectives obtained by its use, reference should be made to the accompanying drawings and description which relate to a preferred embodiment thereof.

DETAILED DESCRIPTION OF PREFERRED EMBODIMENTS OF THE INVENTION

Figure 1:
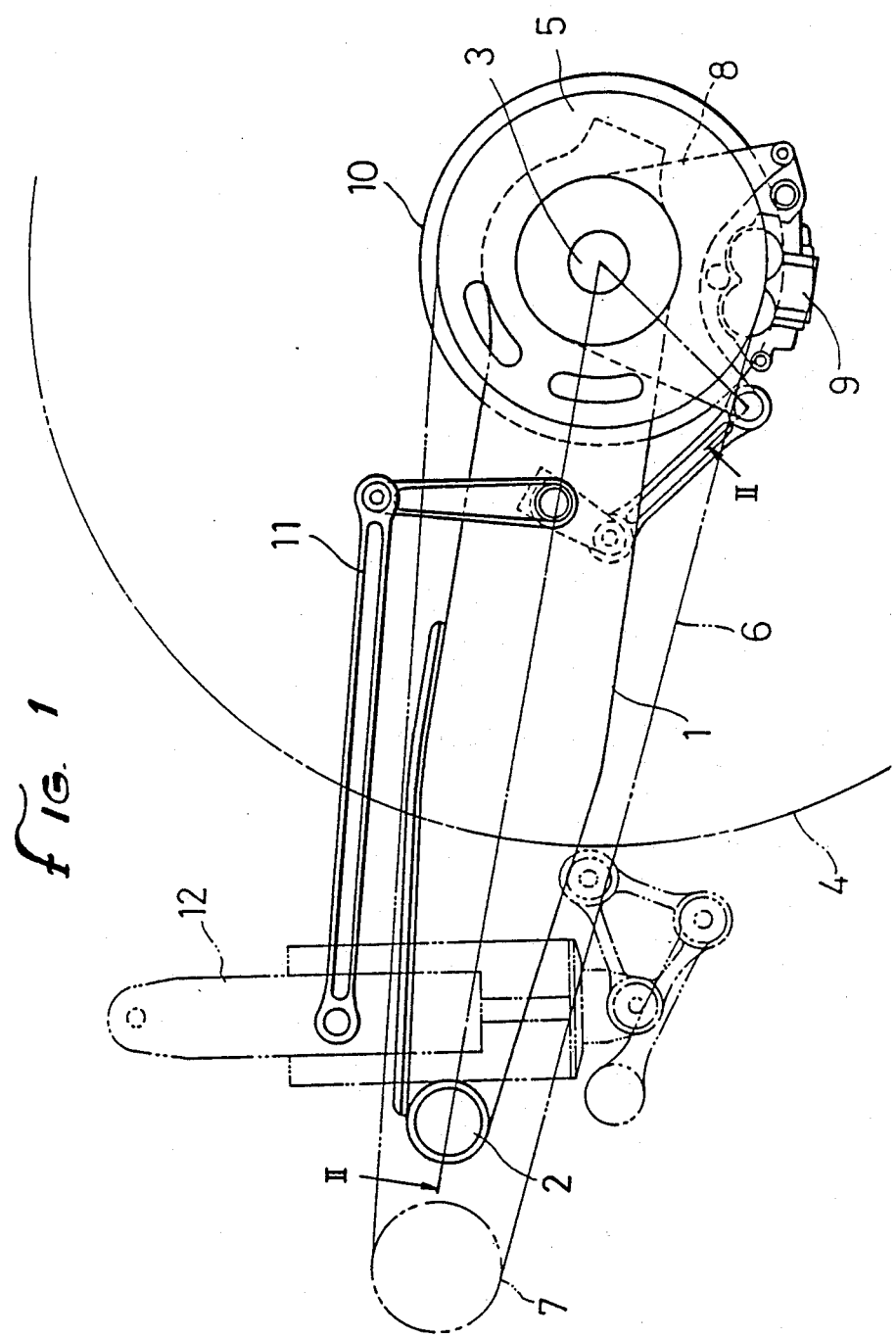
FIG. 1 is a side elevation view of a rear wheel holding mechanism according to the present invention.
Figure 2:
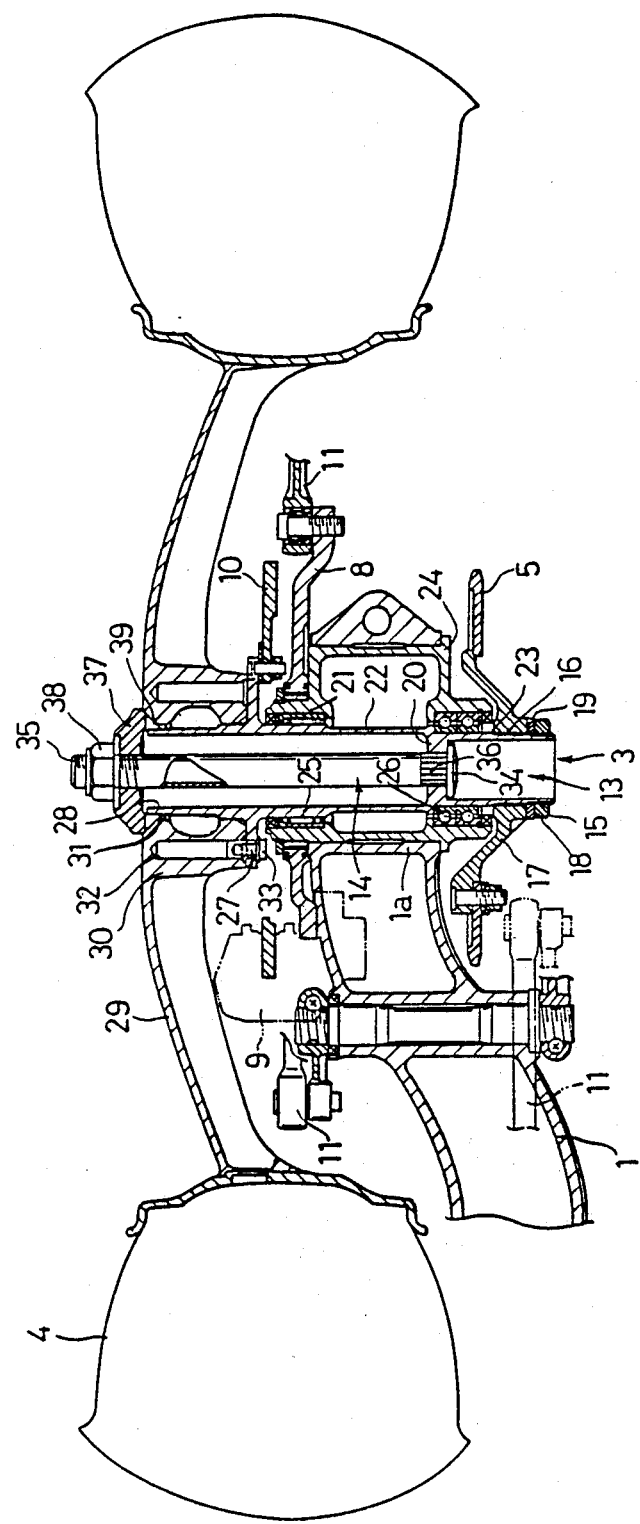
FIG. 2 is a longitudinal sectional view of the rear wheel holding mechanism of FIG. 1.

Referring to FIGS. 1 and 2, there is shown a rear wheel holding mechanism for a motorcycle having a cantilever swing arm 1. The swing arm 1 has a pivot connection 2 at the front end thereof for pivotally connecting the swing arm to the motorcycle main frame (not shown). A rear wheel 4 is held in cantilever fashion at the rear end of the swing arm 1 by means of a driving axle 3.

A driven sprocket 5 is secured to the driving axle 3 for rotation together therewith. The driven sprocket 5 is rotatively driven through a driving sprocket 7 fixed to the output shaft of an engine (not shown) and a chain 6. A caliper bracket 8, which will be described hereafter, is mounted for free turning movement on the driving axle 3, and a caliper 9, of known construction, is attached to the caliper bracket 8. A brake disk 10 is in sliding contact with the caliper 9. The caliper bracket 8 is connected to the motorcycle main frame (not shown) by means of links 11a and 11b and a bell crank 11c so that the caliper 9 is positioned at a fixed position relative to the brake disk 10 regardless of the positional adjustment of the driving axle 3. A shock absorber 12 of known construction is also provided.

The driving axle 3 consists of a hollow outer shaft 13 and a hollow inner shaft 14 having an outside diameter smaller than the inner diameter of the outer shaft 13. The inner shaft 14 is inserted coaxially through the outer shaft 13 to form the driving axle 3 as a double-shaft construction.

The outer circumference of one end of the outer shaft 13 is threaded to form a threaded portion 15. Axially inwardly of the threaded portion 15 is a serrated portion 16. The hub 17 of the driven sprocket 5 is fitted on the serrated portion 16 and fastened to the outer shaft 13 by screwing a nut 18 on the threaded portion 15 with an intermediate washer 19.

Stepped sections 21, 22 and 23, respectively, having diameters decreasing in that order, are formed in the intermediate portion of the outer shaft 13. The outer shaft 13 is, thus, journaled at the intermediate portion on a known eccentric unit 24 with the section 21 supported in a needle bearing 25 and the section 23 supported in ball bearings 26. Since the diameter of the outer shaft 13 is stepped down toward the extremity thereof containing the drive sprocket 5, the outer shaft 13 can easily be passed through the needle bearing 25 and the ball bearings 26 fitted in the eccentric unit 24.

The eccentric unit 24 is held in a split fastening 1a formed at the rear end of the swing arm 1 by tightening the split fastening with a bolt. The split fastening 1a can be loosened by unfastening the bolt to enable the eccentric unit 24 to be rotated therein for adjusting the tension of the chain 6 by changing the position of the driving axle 3 relative to the driving sprocket 7.

A flange 27 is formed integrally on the outer shaft 13 at a position near the other extremity 28; namely, the wheel holding end thereof. The extremity 28 is fitted in a through-hole 31 formed in the central portion of the wheel hub 30. Spokes 29 extend radially from the hub 30. Bores 32 are formed in the hub 30 on a circumferential spacing and pins 33 fastened to the flange 27 are received in the respective bores 32 to restrain the hub 30 from rotary movement relative to the flange 27.

The inner shaft 14 is a comparatively long hollow shaft. It has, at one end thereof, a head 34 engaging an inner flange 20 formed integrally with the outer shaft 13 transversely of the interior thereof. The inner shaft 14 is passed through a central through-hole in the flange 20, and the other end thereof projects axially outwardly from the extremity 28 of the outer shaft 13. A splined portion 36 formed in the neck near the head 34 of the inner shaft 14 enables the inner shaft 14 to be spline-connected to the inner flange 20 of the outer shaft 13 so that the two shafts rotate together. An externally threaded portion 35 is formed at the other extremity of the inner shaft 14 and an axle nut 38 is screwed onto the threaded portion 35 to fasten the inner shaft 14, the hub 30 and the outer shaft 13 together through an intermediate spacer 37.

Figure 3:
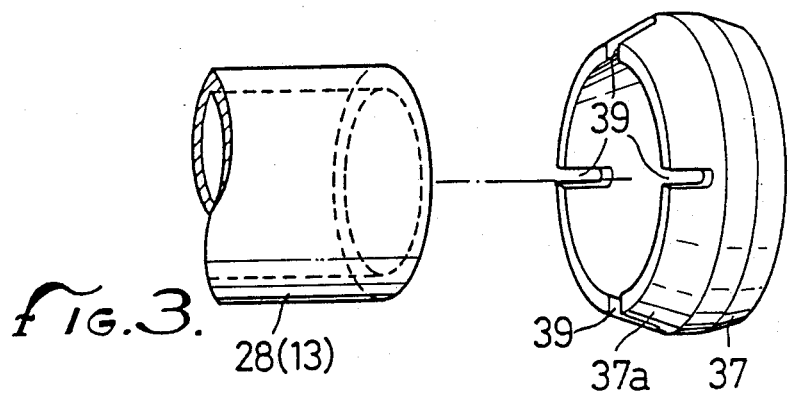
FIG. 3 is an exploded perspective view of an essential portion of the rear wheel holding mechanism of FIG. 1.

As shown in FIG. 3, an external tapered surface 37a is provided on the spacer 37 to form a taper on one end thereof adapted to be brought into contact with the hub 30. A plurality of slits 39 are formed in the tapered end at regular angularly spaced intervals.

The brake disk 10 is bolted to the flange 27, and the caliper bracket 8 is fitted on the boss of the eccentric unit 24.

Figure 4:
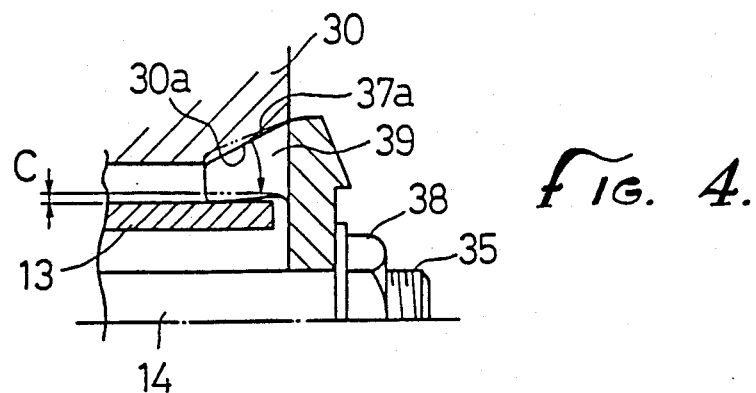
FIG. 4 is a sectional view of an essential portion of the rear wheel holding mechanism of FIG. 1.

The manner of mounting the rear wheel 4 on the rear wheel holding mechanism is as follows. The rear wheel 4 is mounted on the outer shaft 13 with the through-hole 31 of the hub 30 receiving the extremity 28 of the outer shaft 13 therethrough. The hub 30 is then fastened through the spacer 37 to the outer shaft 13 by screwing the axle nut 38 on the threaded portion 35 of the inner shaft 14. Thereafter, as shown in FIG. 4, the tapered surface 37a of the spacer 37 and the cooperating internal tapered surface 30a of the hub 30 engage firmly as the spacer 37 is driven axially by the axle nut 38. Due to the slits 39 formed in the end having the tapered surface 37a, the end is subject to elastic deformation. Hence, the tapered end of the spacer 37 is radially squeezed so as to be pressed firmly to the extremity 28 of the outer shaft thereby to fasten the hub 30 firmly to the outer shaft 13. If the slits 39 are not provided in the tapered end of the spacer 37, it is possible that a clearance C may be formed between the inner circumference of the tapered end of the spacer 37 and the outer shaft 13 due to insufficient elastic deformation of the tapered end of the spacer 37. This reduces the coupling strength existing between the outer shaft 13 and the hub 30. Since the threaded portion 35 of the inner shaft 14 on which the axle nut 38 is screwed has a comparatively small outside diameter, the axle nut 38 can be fastened thereto by a comparatively small torque.

Thereafter, the narrow end of the outer shaft 13, indicated as the stepped section 23, is inserted into the bearing holding part of the eccentric unit 24 and the sprocket hub 17 is fitted on the serrated portion 16 of the outer shaft 13. The nut 18 is then screwed onto the threaded portion 15 of the outer shaft 13 to thereby mount the driving axle 3 to the swing arm 1 with the rear wheel 4 fixedly mounted.

In the rear wheel holding mechanism thus constructed, power is transmitted through the driven sprocket 5 and the driving shaft 3 to the wheel hub 30. Since the power is transmitted to the wheel hub 30 through the outer shaft 13 having a comparatively large outside diameter, the rear wheel holding mechanism has increased torque transmitting capacity. On the other hand, since the inner shaft 14 has a comparatively small outside diameter and a comparatively long length, it is subject to torsion when the axle nut 38 is screwed thereon. The torsional reaction of the inner shaft 14 operates to prevent the axle nut 38 from loosening. Therefore, it is not necessary that the thread of the threaded portion 35 be a reverse thread to prevent loosening of the connection.

Figure 5:
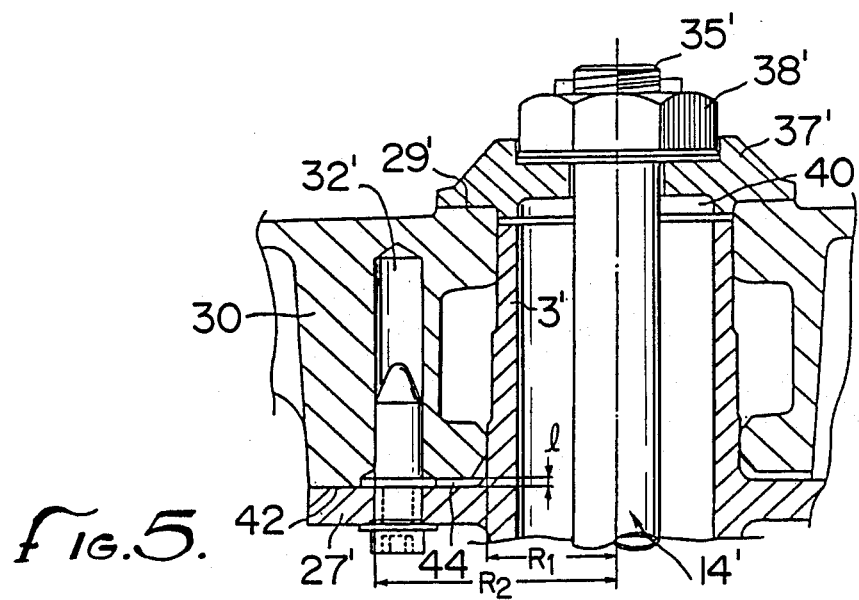
FIG. 5 is a partial longitudinal sectional view of an alternate embodiment of a rear wheel holding mechanism.

FIG. 5 illustrates an alternative form of connection for the rear wheel mounting mechanism. In this embodiment, the seat member 37' of the locking member is in contact with the outer fastening surface of the hub 29'. As shown, the contact surface is perpendicular to the axis of the rear axle 3'. A boss 40 formed on the inner surface of the seat member 37' fits the center hole of a hub 29'. A small gap 44 of an extent, l, is formed between an axle flange 27' and the hub 29'. The inner surface 42 of the hub 29' and the axle flange 27' are in contact with each other in a plane perpendicular to the axis of the rear axle 3'.

When the rear wheel 4' is mounted on the rear axle 3', friction acting on the outer and inner surfaces of the hub 29' acts as a coupling force for coupling the rear wheel and the rear axle 3'.

While the motorcycle is running along a curve, the rear wheel 4' tends to deflect laterally relative to the longitudinal center line of the main frame of the motorcycle and thereby a force acts on each contact surface in a direction oblique to the axis of the rear axle 3'. Since the contact surface of the seat member 37' and the outer fastening surface of the hub 29' are in contact with each other in a plane perpendicular to the axis of the rear axle 3', most of the force acts substantially perpendicularly to the contact surface, and, hence, the coupling force during the running of the motorcycle along a curve is not substantially different from the coupling force during straight running thereof.

In the described arrangement, the radius of the inner circumference of the contact surface of the inner surface 42 of the hub 29' in contact with the axle flange 27' is $R_2$, which, as shown, is significantly greater than the radius $R_1$ of the same contact surface that would exist if the recess 44 were not formed in the inner surface 42 of the hub 29'. Therefore, by means of this described arrangement, the pressure acting on the contact surfaces is significantly increased, so that the inner surface 42 of the hub 29' is secured to the axle flange 27' by a greatly increased coupling force.

Accordingly, it will be appreciated that the described arrangement provides an improved connection between a motorcycle rear wheel and the swing arm to which it is attached. Use of the invention facilitates the removal of the wheel from its suspension for replacement or maintenance purposes. The structural configuration of the various members of the connection arrangement effect improved torque transmission from the driven sprocket to the rear wheel, while, at the same time, enabling threaded connection or release of the members through the application of reduced torque. Moreover, by means of the described alternative form of the invention, the coupling force between the axle and the wheel hub is greatly increased.

It should be further understood that, although a preferred embodiment of the invention has been illustrated and described herein, changes and modifications can be made in the described arrangement without departing from the scope of the appended claims.

I claim:

1. A rear wheel holding mechanism for a motorcycle including a swing arm pivotally connected at one end to the main frame of said motorcycle, a driving shaft supported by said swing arm at the other end thereof, said driving shaft having an externally threaded portion at one end and being coaxially inserted through the hub of said rear wheel to expose said threaded portion, and an axle nut connected to said driving shaft threaded portion, characterized in that said driving shaft comprises an outer shaft formed substantially as a hollow cylinder, an inner shaft having a diameter smaller than that of said outer shaft extending through said outer shaft, a power transmitting member attached to said outer shaft, and said inner shaft containing said threaded portion at one end for reception of said axle nut.

2. A rear wheel holding mechanism for a motorcycle according to claim 1 wherein one end of said outer shaft extends beyond said other end of said swing arm, and said power transmitting member is attached to said one end of said outer shaft.

3. A rear wheel holding mechanism for a motorcycle according to claim 1 wherein said outer shaft contains a transverse flange formed on the interior thereof at a position axially spaced from said rear wheel, and said inner shaft at the end opposite said threaded end being secured to said transverse flange.

4. A rear wheel holding mechanism for a motorcycle according to claim 3 including bearings at axially spaced positions along said outer shaft for rotatably supporting said outer shaft in said swing arm, and said transverse flange being disposed in said outer shaft adjacent the bearing most remote from said rear wheel.

5. A rear wheel holding mechanism for a motorcycle according to claim 1, wherein the external diameter of said outer shaft increases from the end adjacent said power transmitting member toward the other end thereof, and the hub of the rear wheel is fitted on said outer shaft.

6. A rear wheel holding mechanism for a motorcycle according to claim 1 wherein said outer shaft has an external flange engaging the hub of said rear wheel at one end thereof, and a spacer for applying the fastening force of said axle nut to said rear wheel hub at the other end thereof.

7. A rear wheel holding mechanism for a motorcycle according to claim 6 wherein said spacer includes a surface extending in parallel with said external flange and in contact with the hub of said rear wheel.

8. A rear wheel holding mechanism for a motorcycle according to claim 6 including means for fixing said rear wheel to said external flange, and a gap formed between the hub of said rear wheel and the surface of said external flange.

9. A rear wheel holding mechanism for a motorcycle according to claim 6 wherein said spacer includes a conically tapered surface and a complementary tapered surface on said rear wheel hub for engagement with said tapered surface of said spacer.

10. A rear wheel holding mechanism for a motorcycle according to claim 9 including a plurality of circumferentially spaced slits for elastically deforming said spacer tapered surface into engagement with said outer shaft.

11. A rear wheel holding mechanism for a motorcycle including a swing arm pivotally connected at one end to the main frame of said motorcycle, a driving shaft supported by said swing arm at the other end thereof, said driving shaft having a threaded portion at one end and being coaxially inserted through the hub of said rear wheel to expose said threaded portion, and an axle nut connected to said driving shaft threaded portion, characterized in that said driving shaft comprises a hollow outer shaft, bearings at axially spaced positions along said outer shaft for rotatably supporting said outer shaft in said swing arm, a transverse flange formed on the interior of said outer shaft adjacent the bearing most remote from said rear wheel, an inner shaft extending through said outer shaft containing said threaded portion at one end for reception of said axle nut and being secured at its other end to said flange, and a power transmitting member attached to said outer shaft.

12. A rear wheel holding mechanism for a motorcycle including a swing arm pivotally connected at one end to the main frame of said motorcycle, a driving shaft supported by said swing arm at the other end thereof, said driving shaft having a threaded portion at one end and being coaxially inserted through the hub of said rear wheel to expose said threaded portion, and an axle nut connected to said driving shaft threaded portion, characterized in that said driving shaft comprises a hollow outer shaft having an external flange engaging the hub of said rear wheel on one side thereof, an inner shaft extending through said outer shaft, said inner shaft being of smaller diameter than said outer shaft and threaded at one end for reception of said axle nut, a spacer for applying the fastening force of said axle nut to said rear wheel hub on the other side of said outer shaft external flange, a tapered surface on said rear wheel hub, said spacer including a conically tapered surface for reception in the tapered surface of said hub and having a plurality of circumferentially spaced slits for elastic deformation of said spacer tapered surface into engagement with said outer shaft, and a power transmitting member attached to said outer shaft.

* * * * *

UNITED STATES PATENT AND TRADEMARK OFFICE
CERTIFICATE OF CORRECTION

PATENT NO. : 4,889,205
DATED : December 26, 1989
INVENTOR(S) : ISHIKAWA, Yoshimi It is certified that error appears in the above-identified patent and that said Letters Patent is hereby corrected as shown below:

In the heading of the patent, the inventor's name should read -- ISHIKAWA --.

In the caption of the patent, after "[75] Inventor:" delete "Ishikawa Yoshimi" and insert -- Yoshimi Ishikawa -- therefor.

In claim 6 (column 6, line 5) delete "at" and insert -- on -- therefor.

In claim 6 (column 6, line 6) delete "end" and insert -- side -- therefor.

In claim 6 (column 6, line 8) delete "end" and insert -- side -- therefor.

Signed and Sealed this

Twenty-ninth Day of January, 1991

Attest:

HARRY F. MANBECK, JR.

*Attesting Officer*      *Commissioner of Patents and Trademarks*